United States Patent Office 3,520,356
Patented July 14, 1970

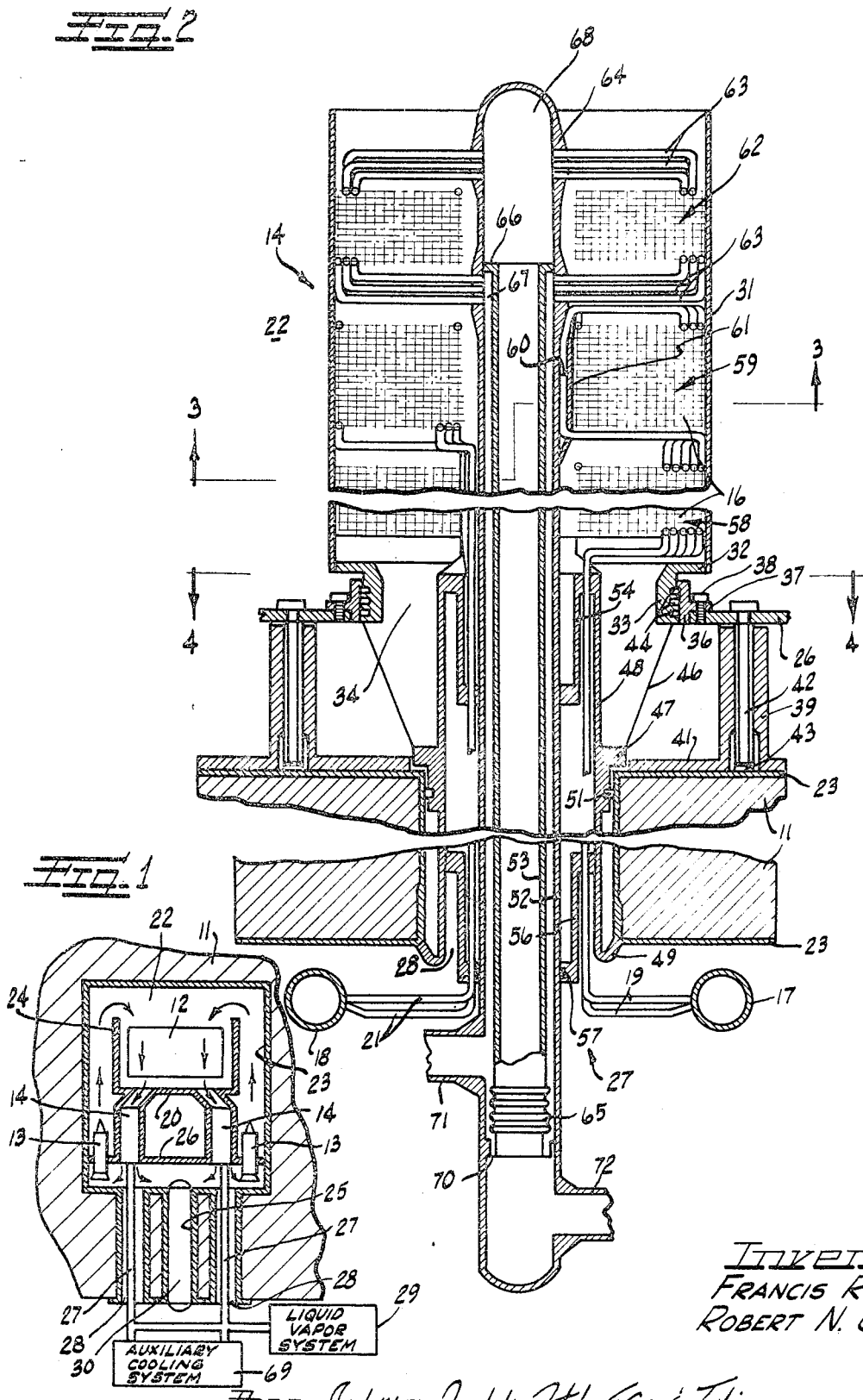

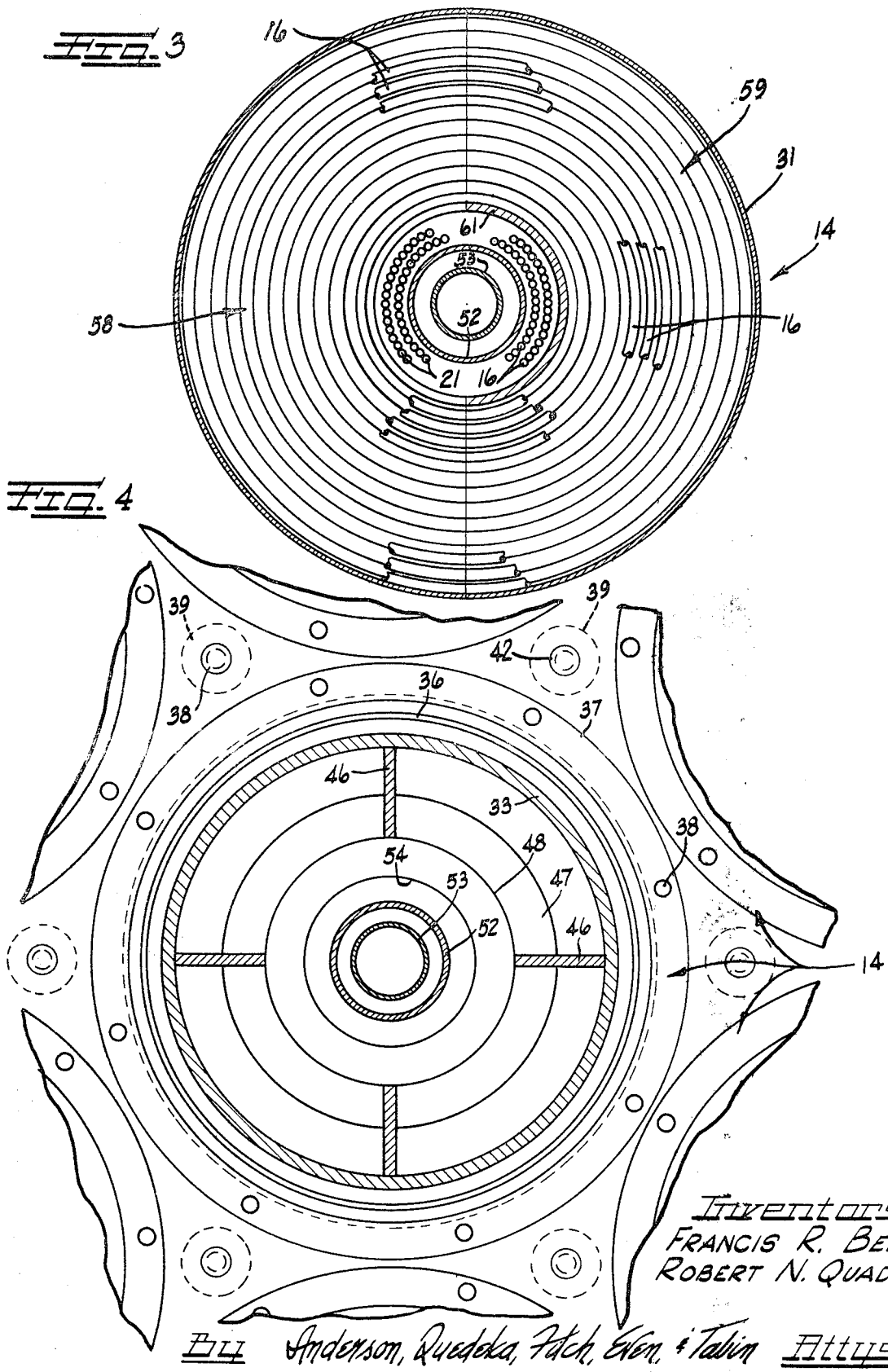

1

3,520,356
VAPOR GENERATOR FOR USE IN A NUCLEAR REACTOR
Francis R. Bell and Robert N. Quade, San Diego, Calif., assignors, by mesne assignments, to the United States of America as represented by the United States Atomic Energy Commission
Filed Sept. 22, 1966, Ser. No. 581,328
Int. Cl. F28f *19/00*
U.S. Cl. 165—134
4 Claims

ABSTRACT OF THE DISCLOSURE

A vapor generator is described for use in a nuclear reactor having a circulating coolant. The vapor generator comprises a plurality of fluid conducting heat exchanger tubes each having two sections of materials with different thermal coefficients of expansion. The sections are welded together end-to-end and the tubes are of a material such that the weld is positioned behind a baffle which deflects the flowing coolant in the reactor.

---

This invention relates to nuclear power reactor systems and, more particularly, to an improved vapor generator for use in a fluid cooled nuclear power reactor system.

Suggestion has heretofore been made of a gas cooled nuclear reactor wherein the entire primary system including the reactive core, primary coolant circulators, vapor generators and associated main primary coolant ducting, are all enclosed within a single reactor vessel. The fact that external main primary coolant ducts are eliminated by enclosing the entire primary system in the reactor vessel avoids the possibility of a sudden loss of coolant due to ducting failure. Where the reactor vessel is constructed of prestressed concrete, the need for additional elaborate biological shielding for enclosing the vapor generators and main primary coolant ducting is eliminated, since the reactor vessel itself performs this function.

In a gas cooled nuclear power reactor system for producing steam, the steam-water system frequently operates at a substantially higher pressure than the coolant gas. For example, where helium is used as the gas coolant, a satisfactory operating pressure for the coolant may be of the order of 700 p.s.i., whereas the pressure in the initial part of the steam generation system (such as an economizer-evaporator and a superheater) may exceed 2,000 p.s.i. Naturally, the inlet feed water pressure is kept slightly greater than the back pressure produced by the steam in order that a flow through the steam generator tubes may be maintained.

Ordinarily, a steam generator consists of a plurality of tube bundles, each tube of which terminates in a header communicating with an inlet water or outlet steam line. Failure of one of these headers or of the water or steam lines with which it communicates can result in a rapid discharge of water or steam or both into the reactor vessel. If this occurs, the internal pressure of the reactor vessel may exceed its design limits with the introduction of the high pressure water or steam. In addition, graphite moderating structure frequently present in a reactive core may react with the water or steam at the high temperatures at which the reactor operates. Finally, a sudden emptying of the tubes in the tube bundles of a steam generator while hot coolant gas continues to flow over them may overheat the tubes and cause structural damage.

Power reactors which use other types of fluid coolants may encounter similar problems upon a sudden rupture in a vapor generator or associated lines. One type of power reactor in which a similar situation may occur is one which utilizes liquid sodium as the primary coolant and which

2 utilizes vapor generators which generate a mercury vapor.

Accordingly, it is an object of this invention to provide a nuclear power reactor system of the type which includes a reactive core, fluid circulating means and a vapor generator enclosed within a reactor vessel, and wherein sudden failure of a high pressure header or line for the vapor generator will not result in a rapid discharge of vapor or liquid into the reactor vessel.

Another object of the invention is to provide a nuclear power reactor of the type described wherein the vapor generators are protected against overheating upon a sudden loss of vapor and liquid.

Still another object of the invention is to provide a vapor generator, for use in a fluid cooled nuclear reactor, which vapor generator is constructed in a manner to avoid a sudden release of vapor or liquid into the reactor vessel.

A more general object of the invention is to provide an improved nuclear power reactor.

Another more general object of the invention is to provide an improved vapor generator for use in a fluid cooled nuclear reactor.

Other objects of the invention will be apparent from the following description taken in connection with the accompanying drawings wherein:

FIG. 1 is a schematic view of a nuclear reactor constructed in accordance with the invention;

FIG. 2 is a full section side view of a steam generator constructed in accordance with the invention and illustrating its placement and mounting in a nuclear reactor in accordance with the invention;

FIG. 3 is an enlarged sectional view taken along the line 3—3 of FIG. 2; and

FIG. 4 is an enlarged sectional view taken along the line 4—4 of FIG. 2.

Very generally, the fluid cooled reactor includes at least one vapor generator 14 comprising a plurality of fluid conducting heat exchanger tubes 16 positioned in a reactor vessel 11 enclosing a reactive core 12. The heat exchanger tubes are disposed in the primary fluid coolant flow established by circulating means 13. The vapor generator also comprises header means 17 and 18 positioned exteriorly of the reactor vessel for supplying fluid to and receiving fluid from the heat exchanger tubes at inlet and outlet pressures substantially greater than the pressure of the primary coolant in the reactor vessel. The vapor generator further comprises a plurality of inlet conduits 19 and a plurality of outlet conduits 21 extending through a wall of the reactor vessel and providing fluid communication between the heat exchanger tubes and the header means.

Referring now more particularly to FIG. 1, the reactor illustrated therein comprises a reactive core 12 which may be of any suitable construction for generating heat from a fission chain reaction. The core is supported by suitable means, not shown, within a chamber 22 defined by the reactor vessel 11. The reactor vessel is preferably of prestressed concrete and may be of any suitable exterior shape. The chamber 22 is substantially cylindrical and is provided with an alloy steel liner 23 which may be cooled by means, not shown.

The reactor illustrated in FIG. 1 is a gas cooled nuclear reactor of the type which includes gas circulating means and steam generating means enclosed with the reactive core 12 within the reactor vessel. More particularly, a plurality of steam generators 14 are disposed within the chamber 22, as are a plurality of gas circulating devices 13. The latter may be of any construction capable of compressing the gas coolant after it has passed over the steam generators and recirculating it such that the gas may be passed once again over the reactive core to remove heat therefrom. As used herein, the term "over"

in referring to coolant flow includes flow over any heat exchanging surface in the core and is intended to include flow through passages provided in the core for such purpose.

Baffles are included within the chamber 22 for directing the primary gas coolant in the desired path. More particularly, the baffles include a cylindrical wall 24 which extends downwardly from the core 12 and terminates a short distance below the bottom of the core. An upper floor 20 extends transversely of the chamber 22 just below the core and is sealed to the lower edge of the cylindrical wall 24. The steam generators 14 are disposed below the upper floor 20 and communicate with the space above the upper floor within the cylindrical baffle 24. A lower floor 26 extends transversely of the chamber 22 near the bottom thereof and is sealed to the liner 23. The gas circulators 13 are positioned near the cylindrical walls of the chamber 22 and communicate from the space below the lower floor 26 to the rest of the chamber 22. Coolant gas is passed downwardly through the core 12 within the cylindrical wall 24 and through the steam generators 14. The steam generators discharge the gas into the space below the lower floor 26. The gas circulators 13 collect the gas in this lower space and force it upwardly past the outside of the steam generators such that it passes through the annular space surrounding the cylindrical baffle 24 to the top of the core 12. The gas then once again passes down through the core to transfer the heat produced thereby to the steam generators.

Feed water is supplied to the steam generators 14 and steam is removed from the steam generators 14 through the steam generator stems 27, each of which extends downwardly from a respective steam generator. The stems 27 are a composite of conduits, as explained below, and pass through the reactor vessel 11 through suitable penetrations 28 provided therein. The liner 23 for the chamber 22 is brought out through these penetrations. The conduits in the stems 27 are coupled to a steam-water system 29 from which feed water is supplied to the steam generator and from which steam is supplied to turbines for driving electrical generators, the latter two items being not illustrated.

The number of steam generators 14 used depends upon the space available in the chamber 22 and upon the desired power capacity of the reactor. In the illustrated reactor system, a central access penetration 25 with a removable closure 30 is provided for removing each steam generator, as will be explained, in the event repair or replacement is necessary. The steam generators are of sufficiently small diameter to pass through the penetration 25. The steam generators are substantially identical and hence only one will be described in detail.

Referring now particularly to FIGS. 2 through 4, the detailed structure of one of the steam generators 14 may be seen. The steam generator includes a cylindrical housing 31 which forms a duct for passing hot gas through the steam generator. The heat exchanger tubes of the steam generator, explained in detail subsequently, are arranged in bundles suitably supported within the housing 31. Although the specific means for supporting the tube bundles are not illustrated, the bundles may be supported on transverse perforate plates spaced axially along the interior of the housing 31, on cross bars extending transversely interiorly of the housing, or on similar structural means. The top of the housing 31 is open for the entry of hot gas and may be coupled to suitable ducts or gas passages for directing the hot gas from the reactive core 12 into the housing 31. The lower edge of the housing 31 is secured, such as by welding, to the outer edge of an annular flange 32. The flange 32 is turned outwardly from the top of a mounting ring 33.

As previously mentioned, the coolant gas, after passing over the heat exchanger tubes of the steam generator, is discharged into the space below the lower floor 26. To permit this, the lower floor is provided with a suitable opening 34 over which the steam generator 14 is mounted. This mounting is effected by a clamping ring 36 having an outwardly turned flange 37 thereon through which a plurality of bolts 38 are passed which removably secure the clamping ring 36 to the lower floor 26 at the edge of the opening 34 therein. The lower floor is spaced from the reactor lining 23 at the bottom of the chamber 22 by means of a plurality of pedestals 39, each of which extends upwardly from a load distributing plate 41 secured to the liner 23 at the bottom of the chamber. Bolts 42 are passed through the lower floor and the pedestals, and are threaded into inserts 43 disposed at the base of each of the pedestals 39. The interface between the mounting ring 33 and the clamping ring 36 is sealed by a plurality of annular sliding seals 44 to accommodate thermal expansion of the steam generator 14 with respect to the elevation of the lower floor 26. As may be seen in FIG. 4, the various steam generators 14 are spaced with respect to each other such that the peripheries of the clamping rings 37 for the respective steam generators are immediately adjacent each other.

A containment arrangement is provided for each of the penetrations 28 in order to prevent the escape of coolant and contaminated material therefrom. The steam generator 14 is attached to the containment arrangement by means of a plurality of radial fins 46. These fins extend inwardly from the mounting ring 33, extending outwardly at their tops over the mounting ring to the inner side of the housing 31. The lower edges of the fins 46 are supported on an annular shoulder 47 extending outwardly from the wall of a cylindrical containment tube 48. The inner edges of the fins 46 terminate against the wall of the containment tube 48 and are secured thereto. The containment tube 48 extends downwardly through the penetration 28 to the outside of the reactor vessel 11. The liner 23 for the chamber 22 is also brought out through the penetration 28 and the containment tube 48 is flanged outwardly at its lower end 49 and welded to the liner 23. An annular seal 51 is disposed in the outer surface of the containment tube 48 near the top of the penetration 28 and effects a sliding seal between the containment tube and the liner 23 in the penetration. This sliding seal is resiliently compressible and accommodates both axial and radial expansion and contraction of the containment tube with respect to the liner.

The steam generator 14 includes a reheater, which will be explained subsequently, and the stem 27 includes a pair of concentric reheater conduits 52 and 53 for conducting steam to and from the reheater. The containment tube 48 is secured to the outer reheater conduit 52 by an upper web 54 and a lower web 56. As may be seen in FIG. 2, each of the webs 54 and 56 consists of a vertical cylindrical section having an upper outwardly turned annular flange and a lower inwardly turned annular flange. The webs 54 and 56 may be welded at their flanges to the containment tube and the outer reheater conduit, except that the lower web 56 is not so welded to the outer reheater tube 52. Rather, the inwardly extending lower flange of the lower web 56 is provided with an annular sliding compressible seal 57 which enables the reheater outer conduit 52 to axially and radially expand and contract with respect to the web 56.

The foregoing described arrangement for providing containment within the penetration 28 is capable of accommodating axial and radial expansion due to heating of the various steam generator element. The particular containment arrangement, however, is not the only one which may be used, and other arrangements for providing containment and also accommodating such axial and radial thermal expansion may be utilized, such as bellows sections. The foregoing described containment structure, combining sliding seals as backup for the primary containment minimizes the possibility of a sudden loss of coolant in the event of failure of the primary containment.

Turning now to the particular configuration of the heat exchanger tubes 16 in the steam generator 14, it will be noted that only portions of such tubes are illustrated, with the remainder being indicated by center lines. This is to avoid a cluttered and confusing appearance in the drawings. The particular arrangement and configuration of the tubes 16 in the steam generator is not critical to the invention, except as hereinafter noted, but a particularly desirable configuration is that in which each tube defines a helix. The helices thus formed are of different diameters and arranged to be coaxial to form tube bundles. In the illustrated embodiment, each of the heat exchanger tubes 16 forms two helices, the lower one of which is part of an evaporator-economizer 58 and the upper one of which is part of a superheater 59. The portion of each of the heat exchanger tubes 16 between the helix of the evaporator-economizer and the helix of the superheater is of a configuration which will be described subsequently.

As previously mentioned, the operating pressure of the evaporator-economizer and of the superheater is substantially higher than the pressure of the coolant gas surrounding the heat exchanger tubes 16. The latter may be of the order of 700 p.s.i., whereas the water-steam pressure in the heat exchanger tubes may exceed 2,000 p.s.i.

Naturally, some means must be provided for supplying feed water to each of the individual heat exchanger tubes 16 and for collecting steam therefrom. A satisfactory way of accomplishing this is by use of headers. A header comprises means defining a chamber with which each of the individual tubes communicates. The header, in turn, communicates with a line through which water or steam is passed to or from the header. Operation at pressures exceeding 2,000 p.s.i. usually necessitates corresponding pressures at the inlet and outlet headers for the heat exchanger tubes. The outlet pressure is generally maintained slightly lower than the inlet pressure in order that there be a flow through the heat exchanger tubes between the headers.

Rupture of a header may result in a rapid discharge of steam or water. Such a discharge within the reactor vessel of a nuclear reactor may exceed the design pressure of the reactor vessel, resulting in failure of the vessel and a discharge of contaminants into the surrounding region. Where, as is frequently the case, a graphite moderator structure is utilized as part of the core construction of the reactor, a graphite-water chemical reaction may take place because of the high temperatures. This results in severe damage to the core structure and liberation of considerable amounts of contaminants within the reactor vessel.

In accordance with the invention, the danger of a sudden discharge of water or steam at high pressure within the reactor vessel is eliminated. To do so, all the high pressure main headers of the system (the headers for the evaporator-economizer and the superheater in the illustrated steam generator) are located exteriorly of the reactor vessel. In the illustrated embodiment, the feedwater inlet header 17 is located below the reactor vessel 11 and is coupled to each of the heat exchanger tubes 16 of the evaporator-economizer 58 by means of a plurality of inlet tubes 19. The latter are part of the stem 27, passing through the penetration 28 within the containment tube 48 through suitable openings in the outwardly turned uper flanges opf the webs 54 and 56.

In the illustrated embodiment, each of the inlet tubes 19 communicates with one of the heat exchanger tubes 16 such that the heat exchanger tubes are individually couled to the header 17. The inlet tubes may be continuous with the heat exchanger tubes or, if desired, the number of inlet tubes 19 may be reduced by placing subheaders within the reactor vessel 11. It is preferred, however, that the number of inlet tubes 19 be at least equal to one-fourth the number of heat exchanger tubes 16. By such a construction, any rupture of an individual heat exchanger tube or inlet tube 19 will result only in a relatively slow buildup of pressure and discharge of steam within the reactor vessel 11. Suitable means may be provided for detecting such pressure increase or steam build-up within the reactor vessel in order to effect appropriate safety measures before a dangerous condition is reached.

Similar considerations are applied in the positioning of the steam outlet header 18. In the illustrated embodiment, each of the individual heat exchanger tubes 16 is coupled at its outlet end individually to the outlet header 18 by corresponding plurality of outlet tubes 21. The outlet tubes 21 are part of the stem 27, passing through the penetration 28 through suitable openings in the inwardly turned lower flanges of the webs 54 and 56. The outlet tubes may be continuous with the heat exchanger tubes or as mentioned in connection with the inlet tubes 19, subheaders may be provided between the outlet of the heat exchanger tubes 16 and the outlet tubes 21. It is preferred, however, that the number of outlet tubes be at least equal to one-fourth the number of heat exchanger tubes. Here again, rupture of a heat exchanger tube 16 or an outlet conduit tube 21 will result in a relatively slow discharge of steam or water into the interior of the reactor vessel, making it possible to sense the danger and effect timely and appropriate safety measures.

The upper helical portions of the heat exchanger tubes 16, which comprise the superheater 59, are normally constructed of a relatively expensive high alloy steel in order that the high pressure and high temperature within the superheater may be satisfactorily contended with. To construct the evaporator-economizer of the same high alloy steel is frequently unnecessary because of the lower temperatures therein. Accordingly, a weld (indicated at 60) exists in each heat exchanger tube 16 between the thereof. Exposure of this bimetal weld to the extreme temperatures of the coolant gas may result in failure due to cracking of the weld caused by differential expansion or by thermal stresses resulting from high temperature gradients in the tube wall. In order to isolate the bimetal welds in the heat exchanger tubes 16, the portions of the heat exchanger tubes between the evaporator-economizer 58 and the superheater 59 are passed radially inward to a position adjacent the outer reheater conduit 52. These portions then pass axially upward to the top of the superheater 59 and pass radially outward over the required distance to begin their helical portions. The bimetal welds 60 are placed in the vertical portions of the heat exchanger tubes 16 adjacent the outer reheater conduit 52. A baffle 61, generally of semi-annular shape, extends outwardly from the reheater outer conduit 52 above the bimetal welds, passes vertically downwardly past the bimetal welds and then extends inwardly to once contact the outer reheater conduit 52. The result is that the gas flow passing through the tube bundles, and particularly the superheater 58, is deflected outwardly away from the bimetal welds in the heat exchanger tubes.

In the bundles shown and described, it will be noted that the water-steam flow in the evaporator-economizer 58 is ascending around the tube helices, whereas in the superheater 59 the steam flow is descending around the tube helices. It is to be understood that the portions of the heat exchanger tubes 16 between the helices may be formed to produce different flow directions and that the baffle 61 may assume an appropriate configuration to protect the bimetal welds.

As mentioned previously, the illustrated steam generator 14 is provided with a reheater 62. The reheater is constructed of a plurality of heat exchanger tubes 63 having their central portions formed in concentric helices into a tube bundle. Normally, operating pressures for a reheater are equal to or slightly less than the pressure of the surrounding coolant gas. Accordingly, it is unnecessary to avoid internal headers for the reheater. For reasons subsequently explained, the reheater 62 is placed toward the direction from which the coolant gas is directed through the steam generator. Steam is carried to and from the reheater 62 through the reheater conduits 52 and 53. The latter extend centrally of the steam generator 14 through the centers of the helices defined by the heat exchanger tubes 16.

The conduits 52 and 53 terminate at their upper ends in a header 64 for the reheater. The upper end of the inner reheater conduit 53 contains an outwardly turned annular flange 66 which is welded to the inner wall of the header 64 to thus divide the reheat header into an inlet chamber 67 of annular shape, and an outlet chamber 68. The cold or inlet reheat steam is passed through the outer of the two passages defined by the conduits 52 and 53. Because of this, the outer reheat conduit 52 is at a lower temperature than the inner conduit 53 and therefore may be designed to more easily withstand any pressure differential existing between the coolant gas and the reheat steam. The reheater tubes 63 communicate with each of the chambers 67 and 68 and, as illustrated, will produce a reheat steam flow which is ascending counter to the direction of coolant gas flow. The direction of reheat flow, however, is not necessarily critical to the invention.

The lower end of the inner reheater conduit 53 is formed with a bellows portion 65 and passes through a wall 70 extending transversely of the outer reheater conduit 52. This wall, together with the closed lower end of the conduit 52, forms a chamber for receiving the reheated steam. An outlet orifice 72 communicates with the chamber thus formed and may be attached to the reheat outlet steam line, not shown. An inlet orifice 71 communicates with the interior of the outer conduit 52 above the wall 70 for discharging inlet reheat steam into the annular space between the conduits 52 and 53. The inlet orifice 71 may be coupled to a reheater steam supply line, not shown.

A significant advantage in the placement of the reheater 62 as shown and described is that, because the coolant gas must pass over the reheater tubes 63 before it passes over the superheater, any unusual fluctuations in the temperature of the gas will be damped out prior to the superheater 59. This makes the design of the superheater less complex since it is protected against extreme temperature fluctuations.

A further and particular advantage of reheater placement as shown and described is in its ability to provide emergency cooling in the event of a water-steam system loss by means of an auxiliary cooling system. The auxiliary cooling system 69 may be seen in FIG. 1 and is coupled, by suitable valves, not shown, to the inlet and outlet orifices 71 and 72, respectively, at the lower ends of the reheater conduits 52 and 53. Upon a loss of the steam and water in the steam-water system 29 and a resultant emptying of the heat exchanger tubes 16 and 63, the auxiliary cooling system 69 may be actuated. The valves coupling the auxiliary cooling system to the reheater conduits may be opened such that a flow of coolant, e.g., water, may be established through the reheater tubes 63. Such a coolant may be at a substantially lower temperature than is ordinarily present in the reheat steam, and thus the heat removal capacity of the reheater section may be substantially increased during these emergency conditions. The reheater will be capable of thereby removing sufficient heat from the coolant gas as to prevent overheating of the heat exchanger tubes 16 and 63 and possible damage thereto.

It may therefore be seen that the invention provides an improved fluid cooled nuclear reactor system of the type wherein the reactive core, the circulating means, and the vapor generating means are all enclosed within a reactor vessel. The invention further provides an improved vapor generator for use in a reactor system of the type described. The reactor system and the vapor generator of the invention mitigate against the possibility of a sudden discharge of vapor or liquid or both into the reactor vessel such that over-pressuring of the reactor vessel and chemical reaction between fluids and structure are both avoided. The construction of the steam generator provides protection for the superheater and for the bimetal welds between the superheater and the evaporator-economizer.

If the reactor core 12 and upper floor 20 are removed, the steam generators may be removed from the reactor vessel through the access penetration 25 (with the closure 30 removed). This is accomplished for each unit by cutting the tubes 19 and 21, and the containment tube 48, at the lower end of the penetration 28. The bolts 38 are then removed and the entire steam generator raised until the stem 27 clears the lower floor 26. The lower floor is provided with an opening and removable closure (not illustrated) aligned with the access penetration 25. Such closure is removed and the steam generator is moved into alignment with the penetration 25 and lowered therethrough.

Various modifications and further embodiments of the invention will be apparent to those skilled in the art from the teaching of the foregoing specification and drawings. Such modifications and embodiments are intended to fall within the scope of the appended claims.

What is claimed is:

1. A vapor generator for use in a nuclear reactor having a flowing coolant, comprising, a plurality of fluid conducting heat exchanger tubes adapted to be positioned in the coolant flow, said heat exchanger tubes each being comprised of two sections welded together end to end, one of said sections of each of said heat exchanger tubes comprising part of a superheater and being comprised of a material having a different thermal coefficient of expansion than the material of the other of said sections, baffle means for deflecting the flowing coolant of the reactor, each of said heat exchanger tubes being formed to pass behind said baffle means in the region of the weld between said two sections to position the weld out of the coolant flow.

2. A vapor generator in accordance with claim 1 and including a reheater disposed adjacent said heat exchanger tubes and toward the direction from which the reactor coolant flow is directed so that the coolant will pass over said reheater prior to passing over said heat exchanger tubes.

3. A vapor generator in accordance with claim 2 wherein said reheater includes means for connecting same to a source of auxiliary coolant flow through said reheater for removing heat from the flowing reactor coolant in the event of vapor-liquid system failure.

4. A vapor generator for use in a nuclear reactor having a flowing coolant, comprising a plurality of fluid conducting heat exchanger tubes adapted to be positioned in the coolant flow, some of said heat exchanger tubes comprising a reheater disposed toward the direction from which the coolant flow is directed so that the coolant will pass over said reheater prior to passing over the remainder of said heat exchanger tubes, said reheater including means for connecting same to a source of auxiliary coolant for providing a flow of auxiliary coolant through said reheater for removing heat from the flowing coolant in the event of vapor-liquid system failure.

No references cited.

REUBEN EPSTEIN, Primary Examiner

U.S. Cl. X.R.

122—32; 165—145, 158; 176—38, 53, 60